Nov. 3, 1931.  C. F. SCHENCK  1,830,679
DRILL SPINDLE
Filed Aug. 22, 1929
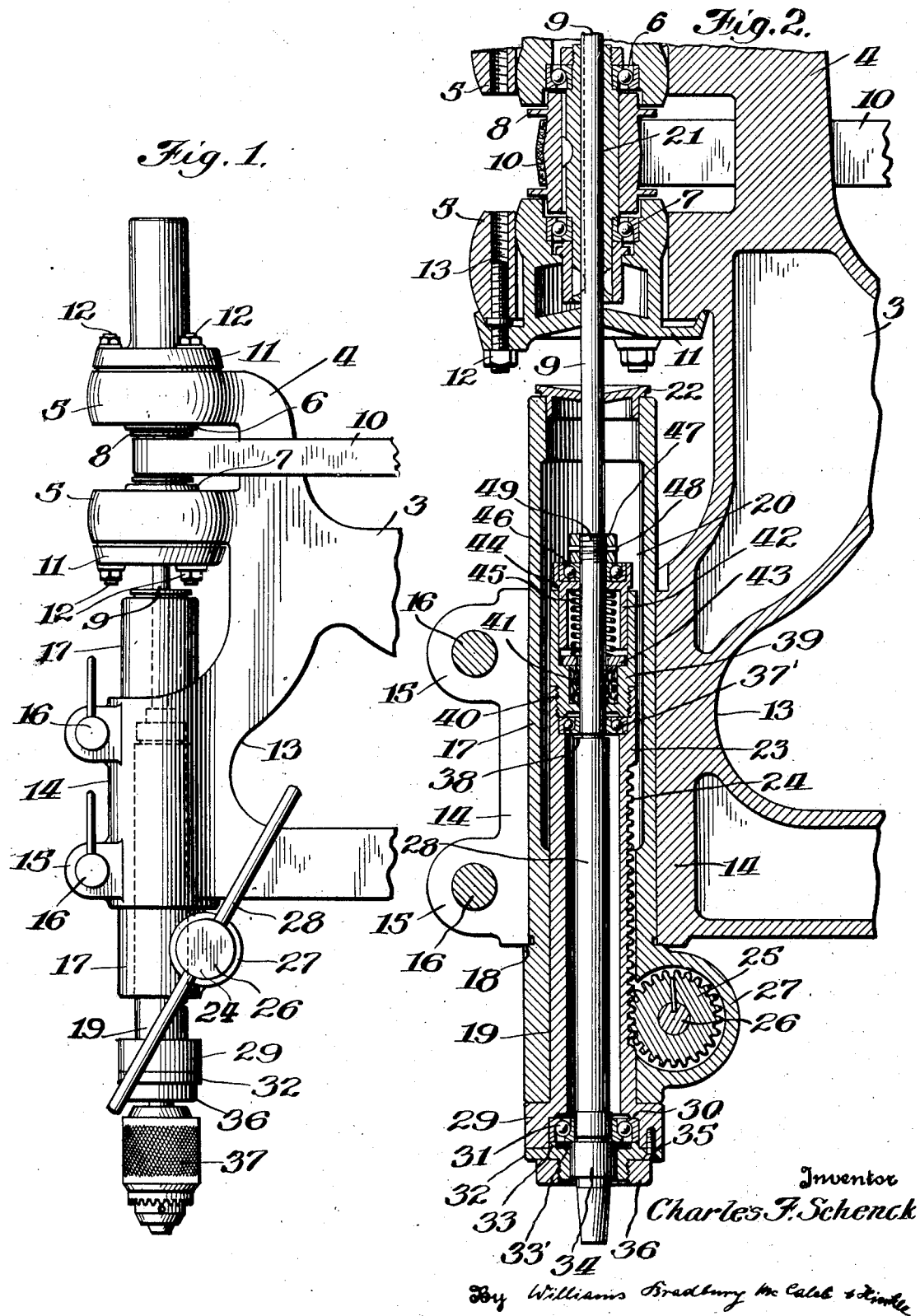
Inventor
Charles F. Schenck
By Williams Bradbury McCaleb & Hinkle
Attorneys Patented Nov. 3, 1931

1,830,679

UNITED STATES PATENT OFFICE

CHARLES F. SCHENCK, OF CLEVELAND, OHIO, ASSIGNOR, BY MESNE ASSIGNMENTS, TO THE TOLEDO GENERAL MANUFACTURING COMPANY, OF TOLEDO, OHIO, A CORPORATION OF OHIO

DRILL SPINDLE

Application filed August 22, 1929. Serial No. 387,655.

This invention relates to drills, and more particularly high-speed, ball-bearing drilling machines and especially to drill spindles. The design, however, is applicable to any other type of rotating spindle.

Heretofore, on the conventional design of drilling machine spindles they were provided upper and lower bearings with a spacer between the two bearings, the spindle or rotating member being threaded at the top and two lock washers being secured onto this threaded portion to hold the entire assembly in position while permitting the spindle to revolve in the quill or spacer held by a bracket of the drill frame. With this type of construction it is positively necessary to have from two to five thousandths vertical motion in the spindle to prevent freezing of the ball bearings when run at high speed, and when wear takes place it is necessary to make the vertical adjustment by means of the two lock washers or nuts in order that there will not be too much play and it is equally important that there not be too little play. These are serious faults with such conventional constructions, and not only result in lost motion, but it is very difficult to make adjustments to within two or three thousandths of an inch and this results in considerable drill breakage.

It is the object of the present invention to overcome these objections in drills and drill spindles as heretofore constructed and to provide a drill spindle in which means is provided to automatically compensate for pressure and wear on the drill and bearings respectively and to absorb all shocks tending to cause injury or breakage. According to experience and reports, with the present construction of drill there has been a reduction in drill breakage and a saving in equipment effected of from between 85 to 450%.

A further object of the invention is to provide a drill spindle assembly particularly for high speed, sensitive, ball bearing drilling machines which is so designed as to facilitate manufacture and assemblage and is provided with bearings so arranged as to fully absorb all radial and end or vertical thrust, thus increasing the useful life of the drill and at the same time providing a structure which is attractive in design, economical to manufacture and able to stand up under hard usage.

Other objects and advantages will be apparent as the description of the drawings proceeds.

In the accompanying drawings,

Fig. 1 is a side elevation of a portion of a drill showing the bracket with a drill spindle in accordance with the invention; and Fig. 2 is an enlarged central longitudinal sectional view of the structure shown in Fig. 1.

In the embodiment of the invention illustrated by way of example in the drawings, there is shown a portion of a high speed, sensitive, ball bearing drilling machine of a known type to which the present construction of quill and drill spindle is particularly adapted. It includes the usual standard 3 having an overhanging bearing arm 4 with sleeves 5 for ball bearings 6 and 7 adapted to take a pulley 8 which is fixed to the drill spindle 9 driven in any suitable way as by means of a belt 10 trained around the pulley 8. The lower bearing is shown supported by a plate 11 through which bolts 12 are engaged and threaded into sockets 13 in the lower sleeve 5 or otherwise. A similar construction is used at the top sleeve as disclosed in Figure 1, except that the bolts 12 are screwed into position in the reverse direction, that is, from above.

The lower portion of the arm 3 is provided with a bracket 13 having a split sleeve 14 with aligned apertured ears 15 through which suitable clamping screws 16 are engaged for the purpose of tightly clamping, that is, gripping and holding against movement therein an outer sleeve member 17, the construction of which is more particularly illustrated in Fig. 2 of the drawings. It will be noted that the sleeve 17 projects above and below the bracket 13 and the clamping members thereof and has a shoulder 18 which is adapted to seat against the bottom of the bracket sleeve 14. The sleeve is bored out as indicated at 19 open at the bottom and the upper portion of the bore is enlarged as indicated at 20 to receive the drill spindle 9 axially therethrough, the spindle being splined as indicated at 21 so as to permit vertical adjustment thereof in the pulley 8 as shown at the top of Figure 2. A closure 22 is provided for the top of the sleeve 17 and has an axial opening receiving the drill spindle proper.

The drill spindle includes, aside from the support including the bracket and sleeve, a quill 23 which fits snugly in the lower bore portion 19 of the bracket sleeve 17 and loosely in the upper bore portion 20, while terminating a considerable distance from the top end of said sleeve. The quill is provided with a longitudinal rack 24 engaged by a pinion 25 fixed or keyed to a shaft 26 journaled in a bearing sleeve 27 at the lower rear portion of the sleeve 17 and is manipulated by a cross bar or handle 28 so as to adjust the spindle up and down as required.

The lower portion of the spindle is enlarged as indicated at 38 to extend loosely through the quill 23, that is, circumferentially spaced and the quill has its lower portion formed with an enlargement or housing 29 of right-angular formation, producing a downwardly facing shoulder 30 adapted to accommodate a lower ball bearing 31 of the radial and thrust type with a conical race, in preferred construction or other anti-friction bearing as desired. The outer bearing collar fits within the housing enlargement 29 and the inner bearing collar fits snugly on the enlarged portion of the spindle and the whole assembly is held in position at the bottom by a cap or retainer plate 32 having an annular rib 33 engaging the outer collar and accommodating a felt washer 33'. The spindle has an enlargement 34 producing an upwardly facing shoulder engaging the inner collar, while the plate is secured in position by a screw or other fastener 35. A nut 36 is threaded on a reduced portion of the plate 32 for a quick method of removing chuck 37. The lower end of the spindle is adapted to take a drill chuck or the like 37.

A radial end thrust bearing 37' is mounted on an upwardly facing shoulder in the upper end of the quill 23, the bearing having an outer bearing collar resting on the shoulder and an inner bearing collar slightly spaced from a shoulder 38 formed at the upper portion of the enlargement 28 of the spindle.

A bronze bushing 39 has a reduced portion threaded in the upper end of the quill as indicated at 40 and has its lower end closed except for an axial opening through which the spindle extends. This bushing also forms a seat for the bearing 37', the lower seat for the ball bearing being formed by a shoulder on the spindle as already described and the construction being practically dust-proof.

The bushing forms a packing gland receiving a packing and lubricant retainer 41 and the upper part of the bushing is hollowed out to receive the lower sleeve portion of a bronze container 42 having free movement therein. A collar or packing ring 43 is fitted in the bushing upon the bottom shoulder of the hollowed out portion thereof over the packing 41 and receives an expansible coil spring 45 thereon, the upper end of the spring being engaged against the downwardly facing top wall of the container 42 which carries the spring so that the latter will take up automatically any vertical wear and at the same time holds the ball bearings in positive position. This is rendered possible by forming the top of the container with a race cup 44 taking a ball bearing 46 which may be a straight thrust bearing or otherwise, the bronze container forming the housing of the spring and also a seat for the upper bearing. The spring is compressed and held in this state by a steel collar 47 over the bearing 46 and fixed to the spindle 9 as by means of a tapered pin 48, the collar being screwed on a threaded portion 49 of the spindle, if desired. However, these threads may be and preferably are omitted.

It will thus be seen that the assembly, including the spindle and quill and parts mounted therein, is capable of vertical adjustment in the working operation. Also the spring being held in a dust-proof container or bronze bushing forming a part of the quill assembly, bearing against the quill at the bottom, and restrained from downward or longitudinal movement with respect to the spindle by reason of the bearing 37 engaging the shoulder 38, and the bronze container 42 being restrained against upward movement by engagement of the bearing 46 with the collar 47 fixed to the spindle 9, the spring having its lower seat on the outer member or quill, will exert its pressure against the inner member or spindle with the following results.

It brings on a flexible condition in the spindle that will permit the normal expansion that takes place due to the heat that is generated by the bearings when run at high speed. Therefore, there is no need of allowing two or three thousandths of an inch vertical motion to compensate for this expansion.

The spindle is always held in its normal position due to the spring pressure, the quill being adjusted and held from movement, as heretofore described, and therefore the spindle can not drop as is customary with the conventional design of spindle alluded to in the preliminary part of this description.

When the ball races wear, this wear is automatically compensated for or absorbed due to the upward pressure exerted by the spring, thereby eliminating the necessity of adjustment. Thus all shocks are automatically absorbed or compensated for in addition to pressure and wear and by this method, drill breakage on this particular type of drill machine is very materially reduced.

In actual practice it has been found that there has been a saving or reduction of from 85% to 450% and this is borne out by the fact that all vertical lost motion is entirely eliminated, that all wear that does take place is automatically absorbed or compensated for, all radial lost motion is eliminated and all manual adjustments to overcome wear and lost motion are replaced by automatic adjustment, thereby obviating the necessity of manual adjustment and break-downs resulting from inattention, not to mention the great amount of time required in the old types of constructions due to the accuracy of adjustment which has been required and which has been nigh impossible. With the old construction, while the method of the spindle assembly formed a self-contained unit, still it had to be manually adjusted for wear and rigidly locked and the bearings had to be comparatively small so that they would not stand up in use.

Realizing that practically the entire load is on the lower bearing, in the present design, especially by reason of the enlargement 29 and the cap 32, an enlarged cavity is provided at the bottom of the quill for a much larger radial and thrust bearing which will more efficiently withstand stresses thereon.

This is due to the fact that a spindle rotating at ten thousand R. P. M. will generate considerable frictional heat on the bearings and a certain amount of space vertically must be provided for this motion. In the old construction, as this space became enlarged by wear and to adjust and control this wear, manual adjustment of the two lock nuts was necessary. The present construction is a decided improvement over the old method due to the spring pressure exerted directly on the spindle, holding the parts seated and taking up looseness in the bearings. This is possible owing to the fact that the spring forces the container 42 upwardly against the collar 47 and also holds the bearing parts together at the top and bottom.

The container being shorter than the outer member or bushing part in which it fits, a flexible unit is provided, thus permitting expansion that may be caused by the bearings, and as the ball bearings wear, this wear is automatically absorbed and compensated for. That is, with a pressure exerted on the ball bearings they can not separate or wear an elongated race and create side motion. By this means, since the wear is automatically controlled and absorbed, manual adjustment is thereby entirely eliminated, resulting in a perfect condition highly essential in a sensitive drilling machine.

Moreover, it reduces drill breakage by virtue of the fact that if there is any vertical lost motion in the spindle, the drill point must absorb this motion to secure a proper seat of the bearings before the drilling actually occurs, and when the drill breaks through the metal and resistance is suddenly overcome, the spindle unit drops whatever lost motion is in existence, causing the flutes of the drill to catch in the rough edges of the metal, causing breakage. With vertical motion in existence, sensitiveness and control is lost, causing side shear of the drill, all of which is eliminated in the present construction.

While I have illustrated a preferred embodiment of my invention, many modifications may be made without departing from the spirit of the invention, and I do not wish to be limited to the precise details of construction set forth, but desire to avail myself of all changes within the scope of the appended claims.

I claim:

1. In a drilling machine, the combination of a quill having an enlargement on one end thereof, a combined thrust and radial antifriction bearing seating in said enlargement, a rotatable spindle disposed longitudinally of said quill and having one end journaled in one end of said antifriction bearing, another combined thrust and radial antifriction bearing for said spindle spaced from the first mentioned bearing, a shouldered extension on said quill, a bearing abutment member engaging said second bearing and in sliding engagement with said extension, and spring means constantly exerting tension tending to force said quill extension and abutment member away from each other, thereby automatically to compensate for wear in said bearings and prevent lost motion of said spindle relative to said bearings.

2. In a drilling machine, the combination of a quill having a bushing at its upper end, a spring seated within the bushing, a member telescoping in said bushing and cooperating with the bushing and seat to constitute a container for the spring, a drill spindle in said quill, and antifriction bearings for said spindle mounted respectively within the quill and within the upper end of said telescoping member and adapted to be taken up by an upward thrust of said spring.

3. In a drilling machine, the combination of a quill, a spindle extending through said quill, antifriction bearings for said spindle, opposed abutments secured to said spindle and engaged by said bearings, two members carried by said quill and disposed in telescoping relation to each other to form a housing about the spindle between said bearings, and an expansile spring enclosed by said housing and tending to force said members apart, whereby to take up said bearings.

In witness whereof, I hereunto subscribe my name this 10th day of August, 1929.

CHARLES F. SCHENCK.